(12) United States Patent
Fang

(10) Patent No.: US 10,685,291 B2
(45) Date of Patent: Jun. 16, 2020

(54) SYSTEMS AND METHODS TO RANK JOB CANDIDATES BASED ON MACHINE LEARNING MODEL

(71) Applicant: Facebook, Inc., Menlo Park, CA (US)

(72) Inventor: Miaoqing Fang, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 1051 days.

(21) Appl. No.: 14/987,648

(22) Filed: Jan. 4, 2016

(65) Prior Publication Data

US 2017/0193394 A1    Jul. 6, 2017

(51) Int. Cl.
*G06N 20/00*     (2019.01)
*G06Q 10/10*     (2012.01)
*G06F 16/2455*   (2019.01)
*G06F 16/2457*   (2019.01)

(52) U.S. Cl.
CPC ....... *G06N 20/00* (2019.01); *G06F 16/24556* (2019.01); *G06F 16/24578* (2019.01); *G06Q 10/105* (2013.01)

(58) Field of Classification Search
None
See application file for complete search history.

(56) References Cited

U.S. PATENT DOCUMENTS

| 6,728,695 B1* | 4/2004 | Pathria ............... G06F 17/2715 |
| 8,818,910 B1* | 8/2014 | Liu .................... G06Q 10/1053 |
| | | 705/321 |
| 2002/0042786 A1* | 4/2002 | Scarborough ........ G06Q 10/063 |
| | | 706/21 |
| 2006/0229899 A1* | 10/2006 | Hyder ............... G06F 17/30873 |
| | | 705/1.1 |
| 2014/0122355 A1* | 5/2014 | Hardtke ............... G06Q 10/105 |
| | | 705/321 |
| 2015/0242815 A1* | 8/2015 | Velasco .................. H04W 4/21 |
| | | 705/321 |
| 2017/0031894 A1* | 2/2017 | Bettersworth ........ G06F 17/277 |
| 2017/0286914 A1* | 10/2017 | Fang .................. G06Q 10/1053 |

* cited by examiner

*Primary Examiner* — J. H. Hur
(74) *Attorney, Agent, or Firm* — Sheppard Mullin Richter & Hampton LLP

(57) ABSTRACT

Systems, methods, and non-transitory computer readable media are configured to determine a training set to train a machine learning model. A feature set for the model is determined. The model is trained based on the training set and the feature set to determine a score reflecting a probability that each user in an evaluation set of users is qualified for employment with an organization. A ranking of users in the evaluation set is provided based on the score determined for each user.

20 Claims, 8 Drawing Sheets

SYSTEMS AND METHODS TO RANK JOB CANDIDATES BASED ON MACHINE LEARNING MODEL

FIELD OF THE INVENTION

The present technology relates to the field of machine learning. More particularly, the present technology relates to techniques for ranking job candidates for an organization based on a machine learning model technique.

BACKGROUND

Today, people often utilize computing devices for a wide variety of purposes. Users can use their computing devices, for example, to communicate and otherwise interact with other users. Such interactions are increasingly popular over a social networking system.

Various types of information can be maintained by a social networking system. One type of information is profile information, such as personal information and professional information, which can be shared by users according to their privacy preferences. The personal information about a user can include various types of information, such as name, age, location, social status, and the like. The professional information about the user can include various types of information, such as profession, educational emphasis, and educational degrees. Another type of information is relationships of and interactions by users on the social networking system. Such information can include, for example, a number of connections of a user, timing of actions on the social networking system by the user, a count of pages followed by the user, groups in which the user participates, and the like.

SUMMARY

Various embodiments of the present technology can include systems, methods, and non-transitory computer readable media configured to determine a training set to train a machine learning model. A feature set for the model is determined. The model is trained based on the training set and the feature set to determine a score reflecting a probability that each user in an evaluation set of users is qualified for employment with an organization. A ranking of users in the evaluation set is provided based on the score determined for each user.

In an embodiment, the training set includes users who are employees of the organization.

In an embodiment, the training set further includes users who are employees of a second organization of the same organization type as the organization.

In an embodiment, the feature set comprises at least one of a number of connections of a user in the training set on a social networking system, a number of days since the user performed an action on the social networking system, a number of requests by the user to initiate connections on the social networking system, a number of entities who are following the user on the social networking system, a number of entities followed by the user on the social networking system, college attended by the user, graduate school attended by the user, degrees obtained by the user, concentrations of study by the user, and employers of the user excluding employers of the same type as the organization.

In an embodiment, the determining a feature set further comprises de-duplicating features in the feature set.

In an embodiment, the determining a feature set further comprises: determining that a feature value is likely false based on a veracity score that does not satisfy a threshold veracity value; and re-labeling the feature value.

In an embodiment, the providing a ranking of users further comprises: sorting the users in the evaluation set based on associated scores determined by the model; adjusting the scores for users who are current employees or previous employees of the organization; and generating an ordered list of scores and associated users.

In an embodiment, a look up table to maintain the ordered list of scores and associated users is created.

In an embodiment, in response to an indication provided by a particular user through a user interface to identify and rank job candidates for the organization, connections of the particular user and their associated scores are selected from the look up table.

In an embodiment, the selected connections are presented through the user interface in an order based on their associated scores.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
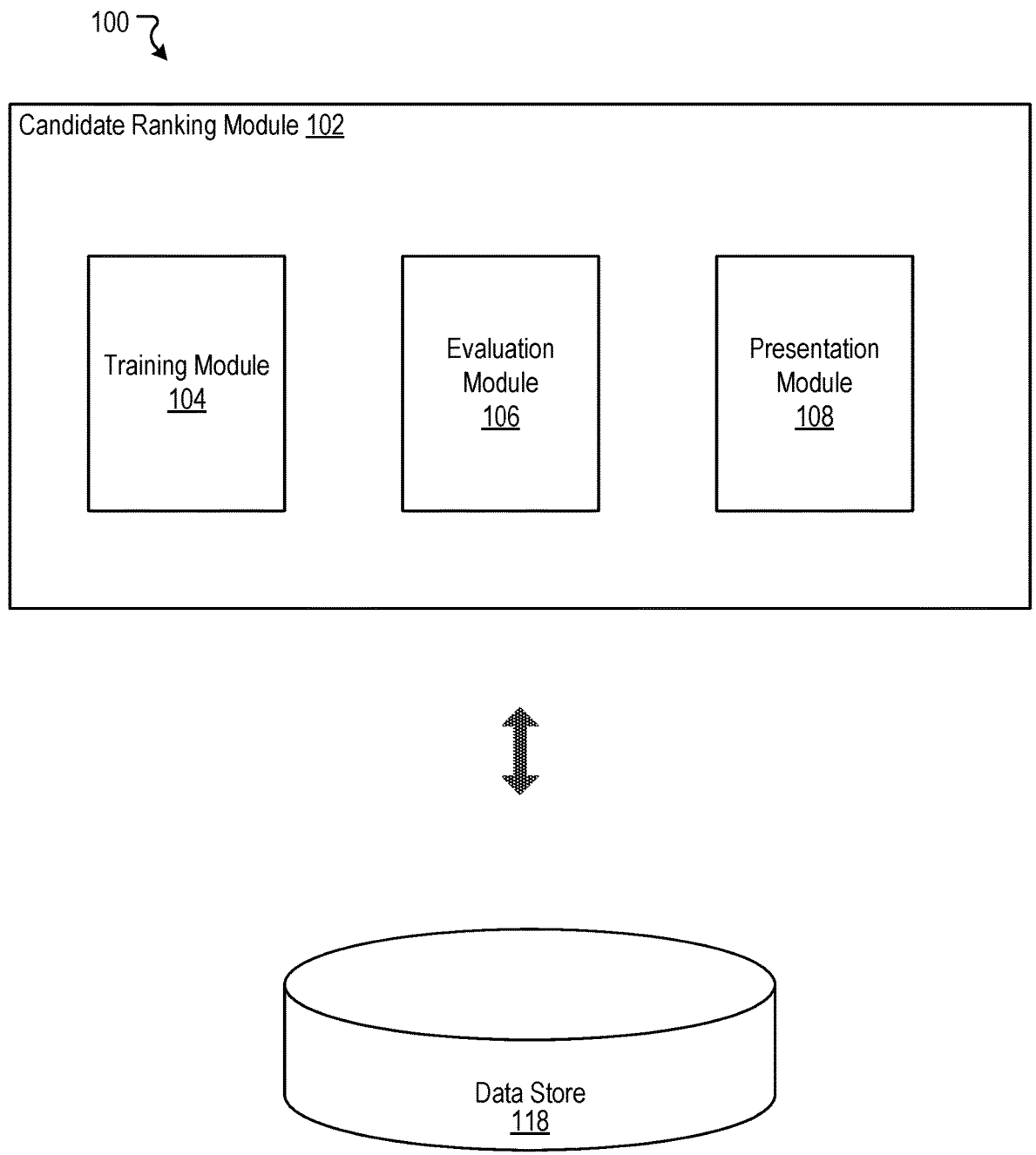
FIG. 1 illustrates a system including an example candidate ranking module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Ranking Job Candidates for an Organization

As mentioned, various types of information can be maintained by a social networking system. One type of information is profile information, such as personal information and professional information, which can be shared by users according to their privacy preferences. The personal information about a user can include various types of information, such as name, age, location, social status, and the like. The professional information about the user can include various types of information, such as profession, educational emphasis, and educational degrees. Another type of information is relationships of and interactions by users on the social networking system. Such information can include, for example, a number of connections of a user, timing of actions on the social networking system by the user, a count of pages followed by the user, groups in which the user participates, and the like.

Despite the availability of such profile information for individual users of a social networking system, organizations often have not been able to leverage the full potential of such information. One common challenge confronted by organizations, such as employers, is identifying and recruiting new employees with suitable experience and qualifications. Common computer implemented techniques for an organization to find job candidates involve publishing advertisements for job positions (or job titles), hiring recruiters to find candidates for the job positions, and relying on existing employees to refer candidates. However, these techniques are rarely, if ever, a reliable, consistent source of qualified job candidates. In many instances, these techniques are limited by the availability of a limited pool of known job candidates during a brief window of time with few guarantees that the pool is well suited to the job positions. These techniques tend to rely on ad hoc identifications of job candidates that fail to systematically leverage the power of a community of a social networking system to identify a comprehensive pool of suitable job candidates over time. In addition, such techniques often cannot distinguish among job candidates based on their suitability for a job position.

An improved approach rooted in computer technology overcomes the foregoing and other disadvantages associated with conventional approaches specifically arising in the realm of computer technology. Systems, methods, and computer readable media of the present technology can rank job candidates based on a machine learning model. During a training stage, a training set of employees for a particular organization can be determined. If the training set has insufficient positive samples, then the training set can be supplemented with positive samples associated with employees of other organizations similar to the particular organization. Various features can be used to train the model. In some instances, the features and their associated values can be maintained and provided by a social networking system of which the training set of employees are members. In some instances, the model can be a linear model based on logistic regression. A technique to identify and account for false feature values can be applied. A de-duplication technique can be applied to reduce feature dimensionality when features are deemed sufficiently similar or related. During an evaluation stage, users and their associated features can be provided to the model to generate a respective score for each user. The score can be a probability that the user is well suited and qualified for a job with the organization. The scores can be sorted from highest score to lowest score. The scores can be adjusted so that scores for current or previous employees of the organization are reduced in value. An ordered list of the scores can be reflected in a fast look up table, such as a laser table. In response to a particular user of the organization requesting or otherwise initiating an identification of job candidates for the organization, connections of the user and their associated scores can be selected from the look up table. The connections of the user can be presented in an order determined by their scores for referral to the organization. More details regarding the present technology are described herein.

FIG. 1 illustrates an example system 100 including an example candidate ranking module 102 configured to rank users as job candidates for an organization (e.g., a technology company) or for a type of organization (e.g., technology companies), according to an embodiment of the present technology. The candidate ranking module 102 can identify and rank the users based on their suitability for employment with an organization (or type of organization) or, in particular, their suitability for a particular job title (or job role) associated with the organization (or type of organization). In some embodiments, the users can be connections of employees of (or contractors with) the organization. In this manner, the candidate ranking module 102 can leverage the power, resources, and information of social networks associated with employees of an organization to enhance recruiting capabilities of the organization and, in particular, to determine relative qualifications and suitability of the users as job candidates. An organization can be any entity, such as a company, an establishment, a non-profit, a business, etc. The organization can be of any type or in any industry, such as aerospace and defense, agriculture, automotive, chemicals, construction, consumer goods and services, energy, financial services, firearms, food and beverage, health care, information and technology (e.g., software, hardware, etc.), real estate, manufacturing, mining and drilling, pharmaceuticals and biotechnology, publishing, telecommunications, transportation, etc. While a technology company may be exemplarily discussed in certain contexts for ease of explanation herein, an organization of any industry type or endeavor can be applicable to the present technology. For example, the present technology can be applied to any other type of organization by tailoring the training of a machine learning model with features that are relevant to the type of organization and its recruiting strategy.

The candidate ranking module 102 can include a training module 104, an evaluation module 106, and a presentation module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the candidate ranking module 102 can be implemented in any suitable combinations.

The training module 104 can develop a machine learning model for determining a probability that a user will be a successful job candidate or employee of an organization. An appropriate training set of samples can be determined. Features associated with the training set can be determined to train the model. The model can be a linear model or a non-linear model. The training module 104 is discussed in more detail herein.

The evaluation module 106 can provide, based on the model, probabilities that a set of users are well suited to and qualified for employment with an organization or otherwise will be hired by the organization. Scores associated with the probabilities can be provided for the set of users. The scores can be sorted to identify the highest ranked users. The scores can be adjusted for current or former employees so that they are provided a lower ranking. The scores can be maintained in a fast look up table. The evaluation module 106 is discussed in more detail herein.

The presentation module 108, through a suitable user interface, can allow the particular user to provide an indication to trigger identification and ranking of connections of the user on a social networking system who are well suited to employment with the organization. In response to the indication, the presentation module 108 can obtain from the look up table an ordered list of connections of the user based on the scores of the connections. The ordered list can be a list of connections such that the connection with the highest score is ranked highest and the connection with the lowest score is ranked lowest. The presentation module 108 can apply a threshold connection value to the ordered list to limit the number of connections in the ordered list. In some instances, the threshold connection value can be a selected number of connections such that no more than the selected number of connections are included in the list. In some instances, the threshold connection value can be a selected probability score such that only those connections having scores that are greater than or equal to the selected probability score are included in the list. The presentation module 108 can present the ordered list to the particular user through the user interface. The presentation module 108 can provide, through the user interface, options for the particular user to refer connections of the ordered list as job candidates to the organization.

In some embodiments, the candidate ranking module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the candidate ranking module 102 can be, in part or in whole, implemented as software running on one or more computing devices or systems, such as on a server or a client computing device. For example, the candidate ranking module 102 can be, in part or in whole, implemented within or configured to operate in conjunction or be integrated with a social networking system (or service), such as a social networking system 630 of FIG. 6. As another example, the candidate ranking module 102 can be implemented as or within a dedicated application (e.g., app), a program, or an applet running on a user computing device or client computing system. In some instances, the candidate ranking module 102 can be, in part or in whole, implemented within or configured to operate in conjunction or be integrated with client computing device, such as a user device 610 of FIG. 6. It should be understood that many variations are possible.

A data store 118 can be configured to store and maintain various types of data, such as the data relating to support of and operation of the candidate ranking module 102. The data can include data relating to, for example, a training set, features for training, features for de-duplication, a machine learning model, an evaluation set, scores for the evaluation set, score adjustments for current or prior employees, sorted list of users, threshold values, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the candidate ranking module 102 can be configured to communicate and/or operate with the data store 118.

Figure 2:
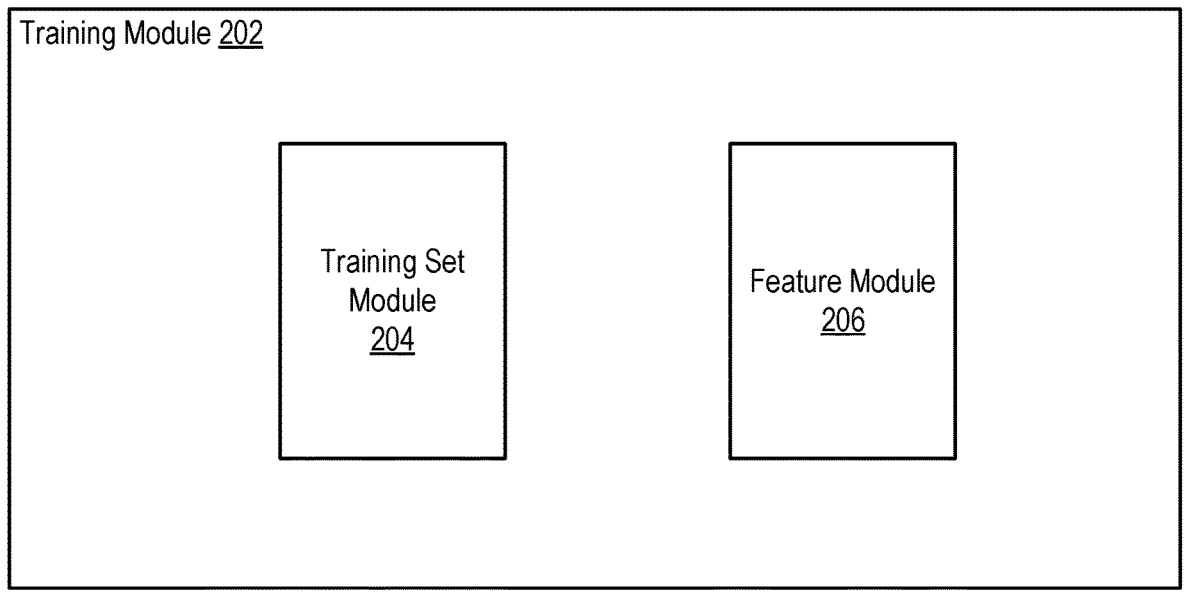
FIG. 2 illustrates an example training module, according to an embodiment of the present technology.

FIG. 2 illustrates an example training module 202, according to an embodiment of the present technology. In some embodiments, the training module 104 of FIG. 1 can be implemented with the training module 202. The training module 202 can create a machine learning model to determine scores reflecting probabilities that users are well suited to or appropriately qualified for employment with an organization. In some embodiments, the training module 202 can develop the model based on a linear model, such as a logistic regression technique. In other embodiments, a nonlinear model (e.g., a gradient boosted tree, random forest, etc.) can be used. The training module 202 can include a training set module 204 and a feature module 206.

The training set module 204 can use information associated with previous and current employees of the organization for which job candidates are to be identified and ranked as positive samples of a training set. The employees can represent the types of employees most desired by the organization. To achieve an appropriate proportion of training samples in comparison to features for training of the model, the training set module 204 can supplement the training set through use of information associated with previous and current employees of organizations that are similar to or of the same type (or profile) as the organization for which job candidates are sought. For example, if the organization for which job candidates are sought is an organization associated with an organization type relating to technology, and if the organization has a number of employees that is insufficient to train a model, the training set module 204 can obtain information associated with employees of a similar second technology organization of the same organization type or profile (i.e., technology), a similar third technology organization of the same organization type or profile (i.e., technology), and so forth as additional positive samples to create an appropriate training set. Similarity among the organizations and their employment standards allows for positive samples that support development of a model matched to the preferences of the organization for which candidates are sought.

The feature module 206 can determine features of users with which to train the model. The features can be any numerical, categorical, or other considerations that may be relevant to the identification and ranking of job candidates for an organization. The number of features for training the model can be any suitable value. In some embodiments, the features can be tailored to or otherwise based on the organization or its type.

As just one example, with respect to an organization that is in the technology industry, the features can be features that inform the identification and ranking of job candidates for employment with a technology organization. In this example, the features can include numerical features and categorical features. The numerical features can include, for example, a number of connections of a user on a social networking system, a number of days since the user performed an action on the social networking system, a number of requests by the user to initiate connections on the social networking system, a number of entities who are following the user on the social networking system, and a number of entities followed by the user on the social networking system. The categorical features can include, for example, college attended by the user, graduate school attended by the user, degrees obtained by the user, concentrations of study by the user, and employers of the user excluding employers of the same type as the organization for which job candidates are sought. With respect to the feature of employers of the user excluding employers of the same type as the organization for which job candidates are sought, assume as an example that the organization is a technology organization. Assume further that the user has worked at another technology organization that is similar to the organization for which job candidates are sought. In this example, the other technology organization need not used as a feature for the sample associated with the user. The feature can be concealed from the training process so that the feature is not given undue weight in the development of the model.

The feature module 206 can determine additional features associated with a user and her interactions on a social networking system (or in real life) relating to groups, events, and topics. Groups can relate to groups on a social networking system in which the user is a member. Events can include certain activities or occurrences on the social networking system in which the user has participated. Topics can relate to sentiments and other subject matter reflected in content postings by the user to the social networking system.

It should be appreciated that additional or fewer features can be used in various embodiments. Each feature can be associated with a plurality of individual features. For example, with respect to the feature of college attended by the user, an associated plurality of individual features can include, for example, attended University1, attended University2, attended University3, etc. In some embodiments, thousands of features can be used.

The feature module 206 can perform a de-duplication technique to reduce dimensionality of a feature set. In some circumstances, some features can be synonymous or otherwise similar or identical in meaning. In other circumstances, some features can be closely related in a hierarchical or taxonomical manner. The feature module 206 can cluster such features and select one representative feature for the cluster to perform training of the model. In this manner, the training of the model can be optimized.

The feature module 206 can provide labels for the determined features based on samples in the training set. In some embodiments, the labels can include, for example, values of 1 for features that are true and values of 0 for features that are false. In some embodiments, the feature module 206 can determine the falsity of feature values associated with a user and appropriately re-label the feature. In this regard, if the feature module 206 determines that a user has indicated that a particular feature is true when, in reality, the particular feature is likely to be false, the feature module 206 can re-label the feature with a value of 0. For example, if information associated with a user constituting a sample in a training set indicates that the user attended University1 or was employed by Company1 but the feature module 206 determines that, in reality, the user likely did not attend University1 or was not employed by Company1, the feature module 206 can appropriately re-label the associated features with values of 0. In some embodiments, the feature module 206 can determine the falsity of a feature value provided by a user based at least in part on analysis of connections and interactions of the user and her connections on a social networking system. Each feature value provided by the user can be associated with a veracity score and, if the veracity score does not satisfy a threshold veracity value, the feature value can be re-labeled.

Figure 3:
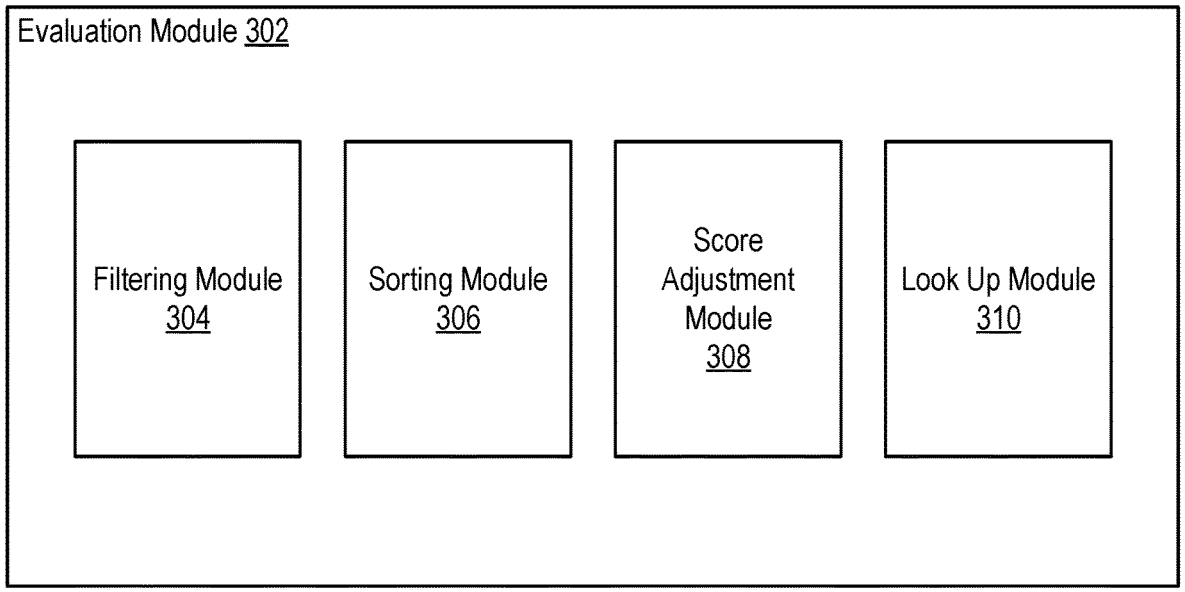
FIG. 3 illustrates an example evaluation module, according to an embodiment of the present technology.

FIG. 3 illustrates an example evaluation module 302, according to an embodiment of the present technology. In some embodiments, the evaluation module 106 of FIG. 1 can be implemented with the evaluation module 302. The evaluation module 302 can include a filtering module 304, a sorting module 306, a score adjustment module 308, and a look up module 310.

The filtering module 304 can apply constraints to an evaluation set of users for whom rankings of job suitability are sought for an organization. The constraints can be based on, for example, employment requirements or preferences of the organization. In some embodiments, the filtering module 304 can select parameters, such as age and location, as constraints. In this regard, the organization may be subject to a minimum age requirement for its employees, such as a minimum age of 18 years old. Accordingly, the filtering module 304 can exclude from the evaluation set those users who are under the minimum age. Further, the organization may choose to focus on job candidates who are located in geographical locations where the organization maintains operations. For example, if the organization has operations in North America and Europe only, the filtering module 304 can exclude from the evaluation set those users who are located outside of North America and Europe. The filtering module 304 can apply other constraints that allow the evaluation set to include only those users who are deemed suitable by the organization. The other constraints can be based on certain desired or undesired traits or attributes of the users. For example, for a technology organization, such as an organization that operates a social networking system, a constraint can include only those users who have been active on the social networking system within a selected time period, such as 30 days or another suitable number of days. In this example, activity on the social networking system (e.g., a log onto the social networking system, a conversion on a page of the social networking system, etc.) can be a signal indicative of job candidates that are well suited for the organization.

The sorting module 306 can provide an evaluation set of users to a model. The model can provide scores for the evaluation set of users that reflect probability for each respective the user in the evaluation set that the user is well suited to and qualified for employment with an organization. In some embodiments, the scores can range in value between 0 and 1. The sorting module 306 can sort the evaluation set of users according to their scores to generate a list. The list can be ordered so that a user associated with a highest probability is ranked highest in the list and that the remaining users are ranked in descending order based on their scores.

The score adjustment module 308 can provide adjustments to scores provided by the model and accordingly rankings of associated users. In some embodiments, the score adjustment module 308 can down rank users who are currently employed by the organization and users who were previously employed by the organization. Current employees need not be identified as job candidates for the organization. Accordingly, in some embodiments, the score adjustment module 308 can reduce the scores of users who are current employees by a selected value, such as by a value of 1 or another suitable value. In this way, users who are current employees are ranked at the bottom of the list. Previous employees in many instances are less likely to return to the organization as employees. Accordingly, in some embodiments, the score adjustment module 308 can reduce the scores of users who are previous employees by a selected value, such as by a value of 0.5 or another suitable value. After the adjustment of the scores, the score adjustment module 308 can create an ordered list of scores and associated users.

The look up module 310 can store the ordered list of scores and associated users in a look up table. Because the number of users in the evaluation set can be large, a fast look up table can be used to quickly provide the ordered list or portions thereof. In some embodiments, the look up table can be implemented as a laser table. For each user in the evaluation set, the look up table can store an associated user ID and corresponding score. As discussed herein, when users are to be identified and ranked as job candidates in response to an indication or command by a particular user, the connections of the particular user and their associated scores can be selected from the ordered list reflected in the look up table based on the user ID of the particular user. The selected connections can be presented to the particular user in the order determined by their scores.

Figure 4:
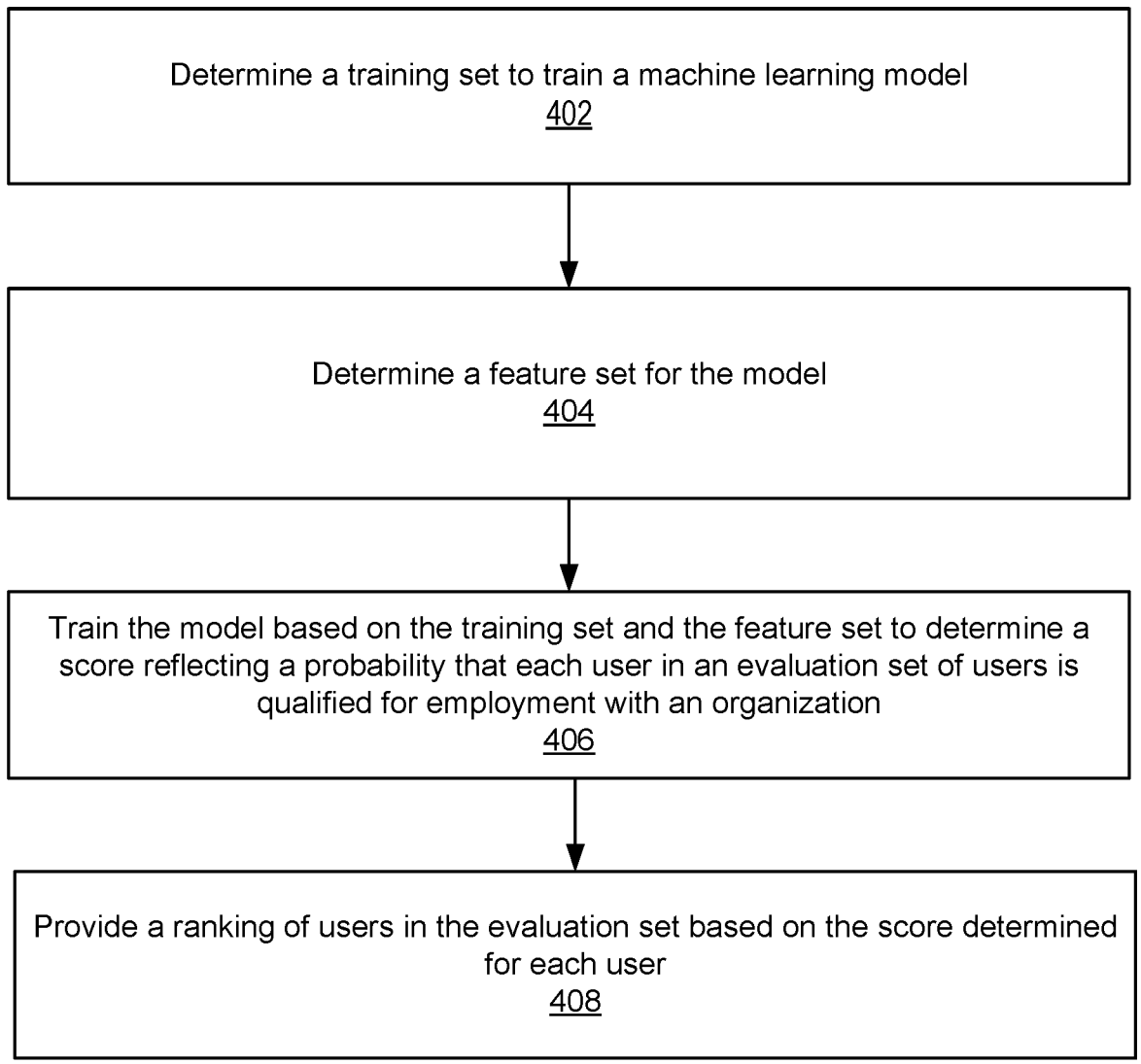
FIG. 4 illustrates a method to train a machine learning model to determine a score reflecting a probability that a user is qualified for employment with an organization, according to an embodiment of the present technology.

FIG. 4 illustrates an example method 400 to train a machine learning model to determine a score reflecting a probability that a user is qualified for employment with an organization, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can determine a training set to train a machine learning model. At block 404, the method 400 can determine a feature set for the model. At block 406, the method 400 can train the model based on the training set and the feature set to determine a score reflecting a probability that each user in an evaluation set of users is qualified for employment with an organization. At block 408, the method 400 can provide a ranking of users in the evaluation set based on the score determined for each user. Other suitable techniques that incorporate various features and embodiments of the present technology are possible.

Figure 5A:
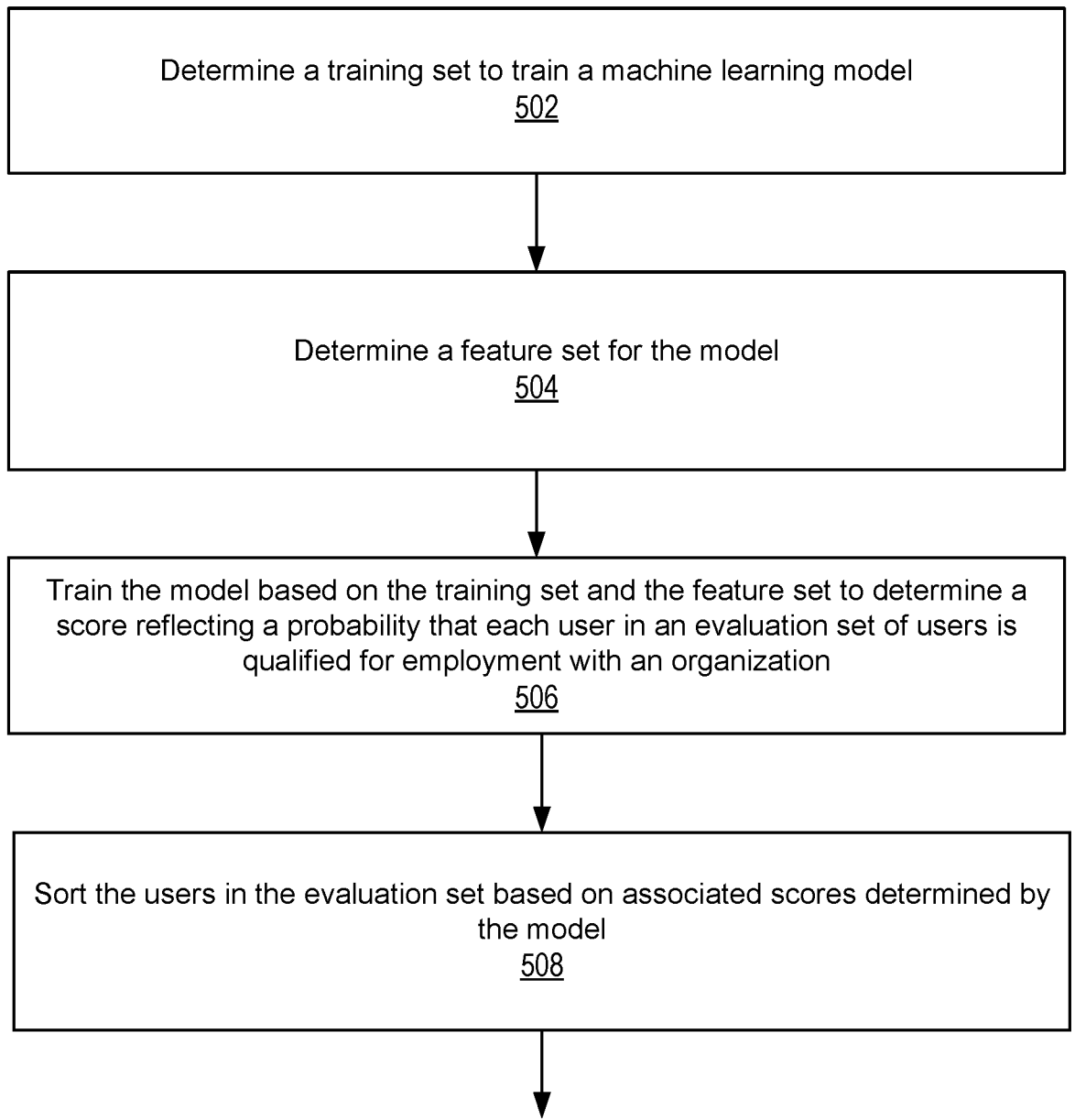
FIGS. 5A-5B illustrate a method to rank an evaluation set of users based on the machine learning model, according to an embodiment of the present technology.
Figure 5B:
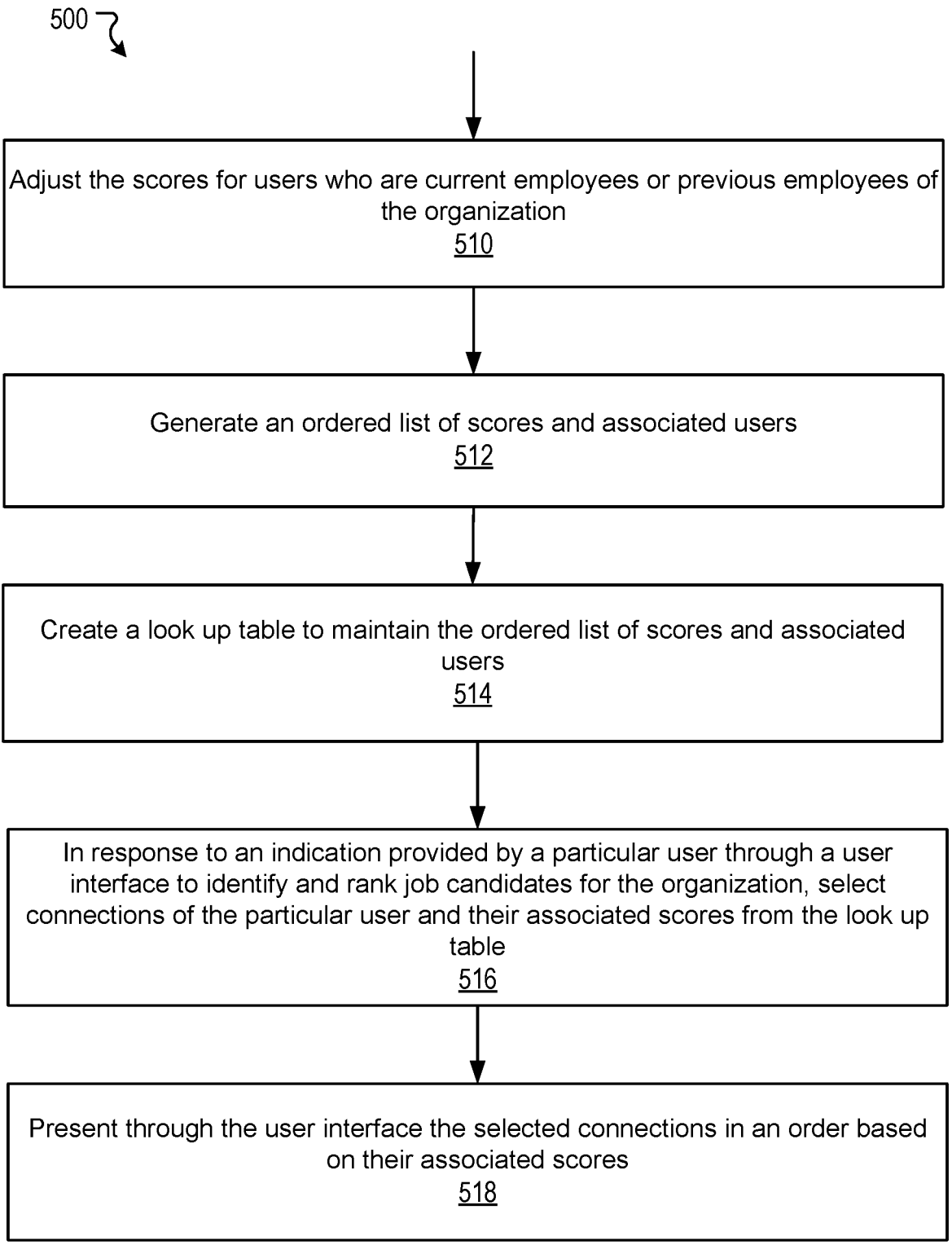

FIGS. 5A-5B illustrate an example method 500 to rank an evaluation set of users based on the machine learning model, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can determine a training set to train a machine learning model. At block 504, the method 500 can determine a feature set for the model. At block 506, the method 500 can train the model based on the training set and the feature set to determine a score reflecting a probability that each user in an evaluation set of users is qualified for employment with an organization. At block 508, the method 500 can sort the users in the evaluation set based on associated scores determined by the model. At block 510, the method 500 can adjust the scores for users who are current employees or previous employees of the organization. At block 512, the method 500 can generate an ordered list of scores and associated users. At block 514, the method 500 can create a look up table to maintain the ordered list of scores and associated users. At block 516, the method 500 can, in response to an indication provided by a particular user through a user interface to identify and rank job candidates for the organization, select connections of the particular user and their associated scores from the look up table. At block 518, the method 500 can present through the user interface the selected connections in an order based on their associated scores. Other suitable techniques that incorporate various features and embodiments of the present technology are possible.

Social Networking System—Example Implementation

Figure 6:
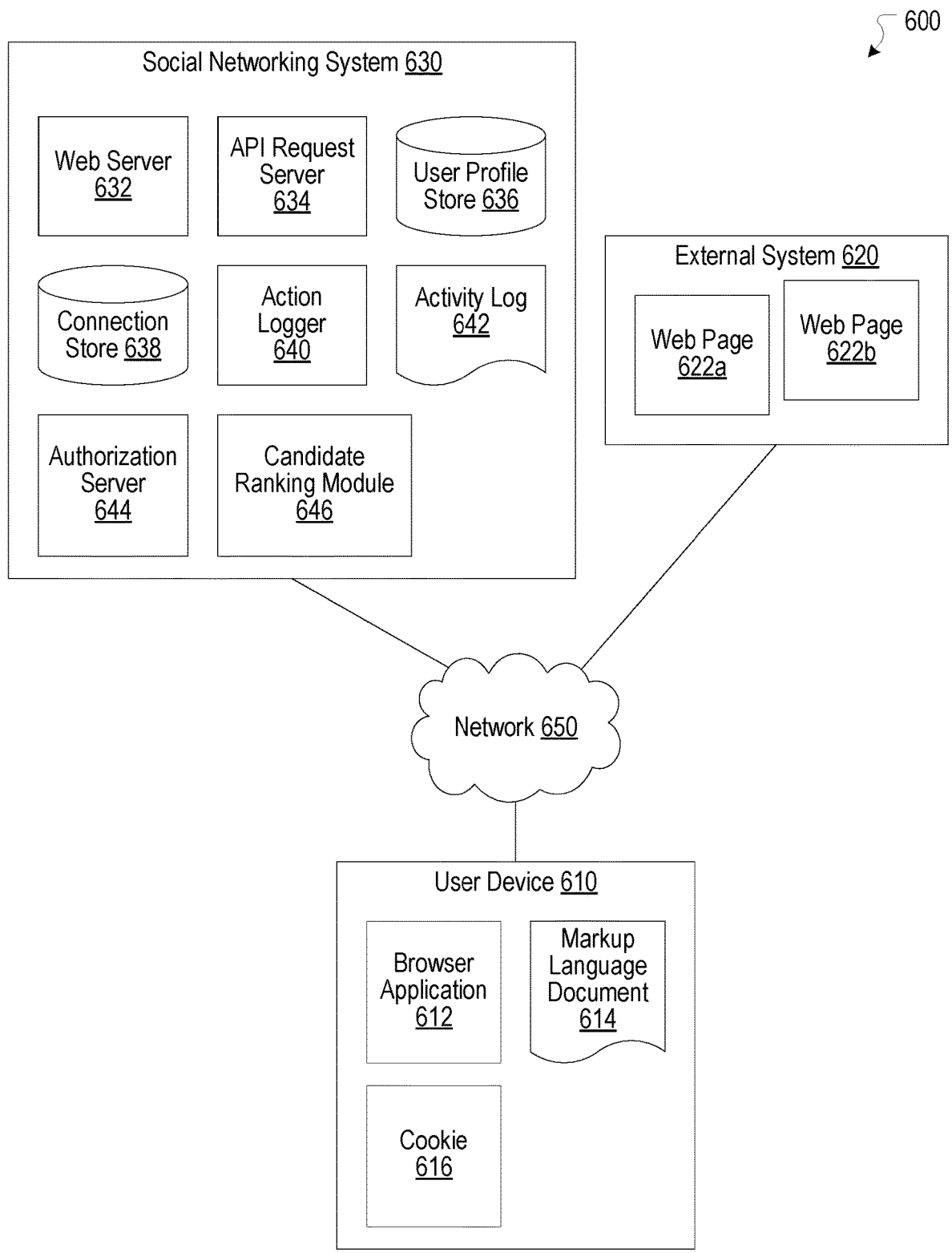
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a candidate ranking module 646. The candidate ranking module 646 can be implemented with the candidate ranking module 102, as discussed in more detail herein. In some embodiments, one or more functionalities of the candidate ranking module 646 can be implemented in the user device 610.

Hardware Implementation

Figure 7:
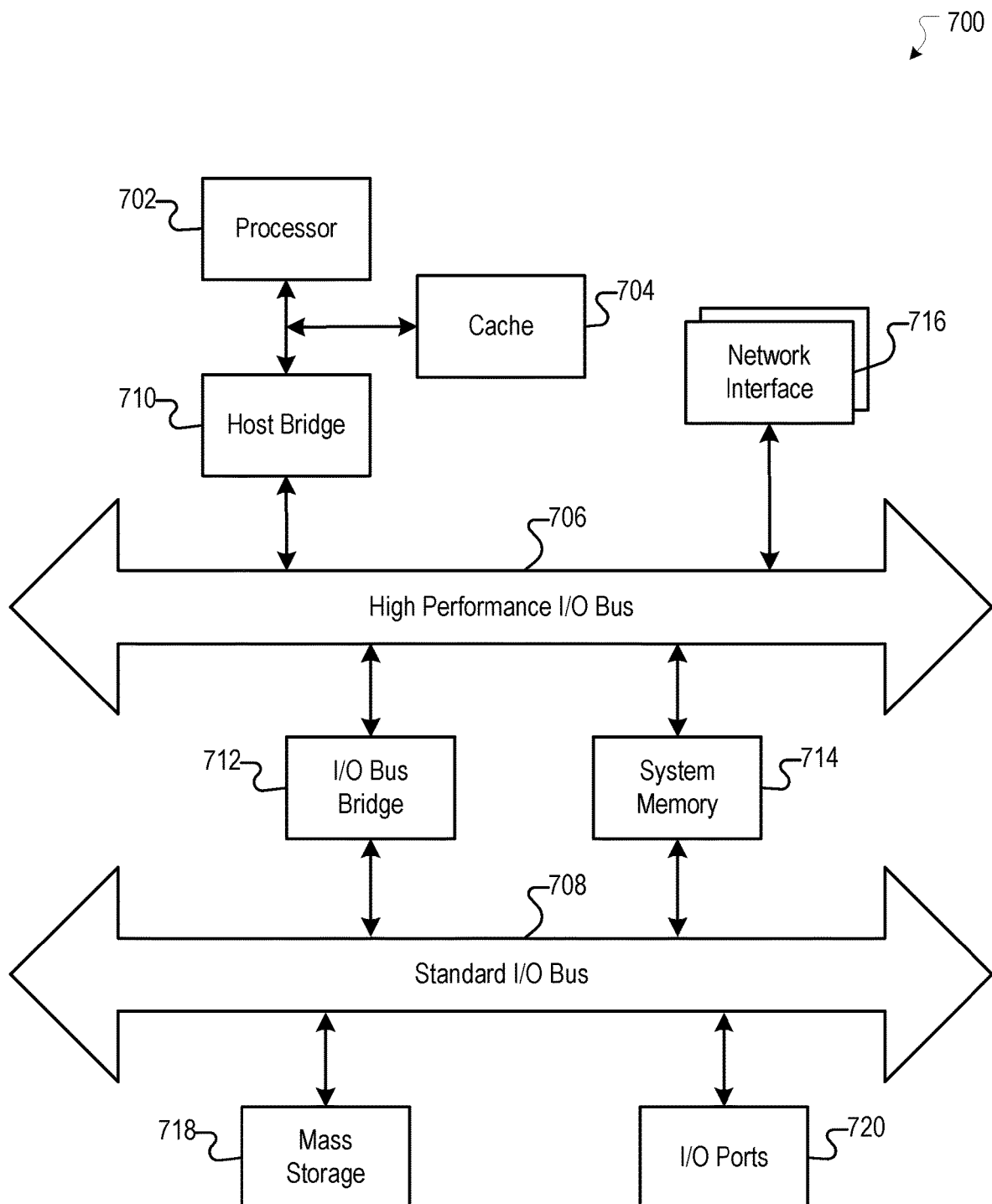
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a training set for a machine learning model, wherein the training set includes employees of an organization who are users of a social networking system;
   determining, by the computing system, a feature set associated with each member of the training set, wherein features in the feature set and their associated values are provided by the social networking system;
   training, by the computing system, the machine learning model based on feature sets associated with members in the training set;
   receiving, by the computing system, an indication provided by an employee of an organization through a user interface to identify job candidates for the organization;
   determining, by the computing system, a plurality of connections of the employee of the organization on the social networking system;
   determining, by the computing system, using the machine learning model, a score reflecting a probability that each of the plurality of connections of the employee is qualified for employment with the organization; and
   ranking, by the computing system, the plurality of connections based on the score determined for each connection.

2. The computer-implemented method of claim 1, wherein the training set further includes users who are employees of a second organization of a same organization type as the organization.

3. The computer-implemented method of claim 1, wherein the feature set comprises at least one of
   a number of connections of a user in the training set on a social networking system,
   a number of days since the user performed an action on the social networking system,
   a number of requests by the user to initiate connections on the social networking system,
   a number of entities who are following the user on the social networking system,
   a number of entities followed by the user on the social networking system,
   college attended by the user,
   graduate school attended by the user,
   degrees obtained by the user,
   concentrations of study by the user, or
   employers of the user excluding employers of the same type as the organization.

4. The computer-implemented method of claim 1, wherein the determining a feature set further comprises:
   de-duplicating features in the feature set.

5. The computer-implemented method of claim 1, wherein the determining a feature set further comprises:
   determining that a feature value is likely false based on a veracity score that does not satisfy a threshold veracity value; and
   re-labeling the feature value.

6. The computer-implemented method of claim 1, wherein the ranking the plurality of connections further comprises:
   sorting the plurality of connections based on associated scores determined by the model;
   adjusting the scores for connections who are current employees or previous employees of the organization; and
   generating an ordered list of scores and associated connections.

7. The computer-implemented method of claim 6, further comprising:
   creating a look up table to maintain the ordered list of scores and associated connections.

8. The computer-implemented method of claim 7, further comprising:
   in response to an indication provided by a particular user through a user interface to identify and rank job candidates for the organization, selecting connections of the particular user and their associated scores from the look up table.

9. The computer-implemented method of claim 8, further comprising:
presenting through the user interface the selected connections in an order based on their associated scores.

10. The computer-implemented method of claim 1, wherein the features in the feature set are numerical or categorical.

11. The computer-implemented method of claim 1, wherein the number of features in the feature set is any suitable value.

12. The computer-implemented method of claim 1, wherein the features in the feature set are tailored to the organization type.

13. A system comprising:
at least one processor; and
a memory storing instructions that, when executed by the at least one processor, cause the system to perform:
  determining a training set for a machine learning model, wherein the training set includes employees of an organization who are users of a social networking system;
  determining a feature set associated with each member of the training set wherein features in the feature set and their associated values are provided by the social networking system;
  training the machine learning model based on feature sets associated with members in the training set;
  receiving an indication provided by an employee of an organization through a user interface to identify job candidates for the organization;
  determining a plurality of connections of the employee of the organization on the social networking system;
  determining, using the machine learning model, a score reflecting a probability that each of the plurality of connections of the employee is qualified for employment with the organization; and
  ranking the plurality of connections based on the score determined for each connection.

14. The system of claim 13, wherein the training set further includes users who are employees of a second organization of the same organization type as the organization.

15. The system of claim 13,
wherein the feature set comprises at least
  one of a number of connections of a user in the training set on a social networking system,
  a number of days since the user performed an action on the social networking system,
  a number of requests by the user to initiate connections on the social networking system,
  a number of entities who are following the user on the social networking system,
  a number of entities followed by the user on the social networking system,
  college attended by the user,
  graduate school attended by the user,
  degrees obtained by the user,
  concentrations of study by the user, or
  employers of the user excluding employers of the same type as the organization.

16. The system of claim 13, wherein the determining a feature set further comprises:
de-duplicating features in the feature set.

17. A non-transitory computer-readable storage medium including instructions that, when executed by at least one processor of a computing system, cause the computing system to perform a method comprising:
  determining a training set for a machine learning model, wherein the training set includes employees of an organization who are users of a social networking system;
  determining a feature set associated with each member of the training set
    wherein features in the feature set and their associated values are provided by the social networking system;
  training the machine learning model based on feature sets associated with members in the training set;
  receiving an indication provided by an employee of an organization through a user interface to identify job candidates for the organization;
  determining a plurality of connections of the employee of the organization on the social networking system;
  determining, using the machine learning model, a score reflecting a probability that each of the plurality of connections of the employee is qualified for employment with the organization; and
  ranking the plurality of connections based on the score determined for each connection.

18. The non-transitory computer-readable storage medium of claim 17, wherein the training set further includes users who are employees of a second organization of the same organization type as the organization.

19. The non-transitory computer-readable storage medium of claim 17,
wherein the feature set comprises at least one of
  a number of connections of a user in the training set on a social networking system,
  a number of days since the user performed an action on the social networking system,
  a number of requests by the user to initiate connections on the social networking system,
  a number of entities who are following the user on the social networking system,
  a number of entities followed by the user on the social networking system,
  college attended by the user,
  graduate school attended by the user,
  degrees obtained by the user,
  concentrations of study by the user, or
  employers of the user excluding employers of the same type as the organization.

20. The non-transitory computer-readable storage medium of claim 17, wherein the determining a feature set further comprises:
de-duplicating features in the feature set.

* * * * *